United States Patent [19]

Geiger

[11] Patent Number: 5,199,460
[45] Date of Patent: Apr. 6, 1993

[54] PUSH BUTTON REVERSE VALVE FOR POWER TOOL

[75] Inventor: Robert E. Geiger, Sayre, Pa.

[73] Assignee: Ingersoll-Rand Company, Woodcliff Lake, N.J.

[21] Appl. No.: 867,548

[22] Filed: Apr. 13, 1992

[51] Int. Cl.[5] .............................................. F16K 11/00
[52] U.S. Cl. ............................... 137/625.43; 251/250; 415/904
[58] Field of Search ............... 137/876, 625.43; 415/82, 904; 251/250

[56] References Cited

U.S. PATENT DOCUMENTS

| | | | |
|---|---|---|---|
| 3,796,232 | 3/1974 | Dalton | 137/625.43 X |
| 3,909,867 | 10/1975 | Hogsell | 415/904 X |
| 3,951,217 | 4/1976 | Wallace et al. | 415/904 X |
| 4,705,074 | 11/1987 | Olsson et al. | 137/876 X |
| 4,890,645 | 1/1990 | Anderson | 251/250 X |

Primary Examiner—John C. Fox
Attorney, Agent, or Firm—Walter C. Vliet

[57] ABSTRACT

A rotary spool reversing valve is described which is operated in rotation by two parallel opposed push buttons. The spool is positioned in line with the incoming air passage permitting incoming air to flow axially through the spool directly to forward or reverse motor ports with a minimum of pressure loss. Thumb operation of the push buttons in a pistol grip tool permits convenient one hand operation with simple molded mechanisms providing economy and ease of operation.

7 Claims, 2 Drawing Sheets

PUSH BUTTON REVERSE VALVE FOR POWER TOOL

BACKGROUND OF THE INVENTION

This invention relates generally to reversing valves for power tools and more particularly to a reversing valve for a pneumatically operated hand held power tool.

In the past, reversing valves for power tools have been complicated in structure or difficult or inconvenient to operate.

The foregoing illustrates limitations known to exist in present reversing valves for power tools. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a push button reverse valve for a power tool comprising a rotatable spool disposed in a circular passageway; a means for engaging and rotating the spool; the spool being further provided with a means for receiving air at its one end and selectively distributing it to one of a plurality of passageways disposed adjacent to its other end; the selected distribution being in response to selected rotation of the spool.

The foregoing and other aspects will become apparent from the following detailed description of the invention when considered in conjunction with the accompanying drawing figures.

DETAILED DESCRIPTION

Figure 1:
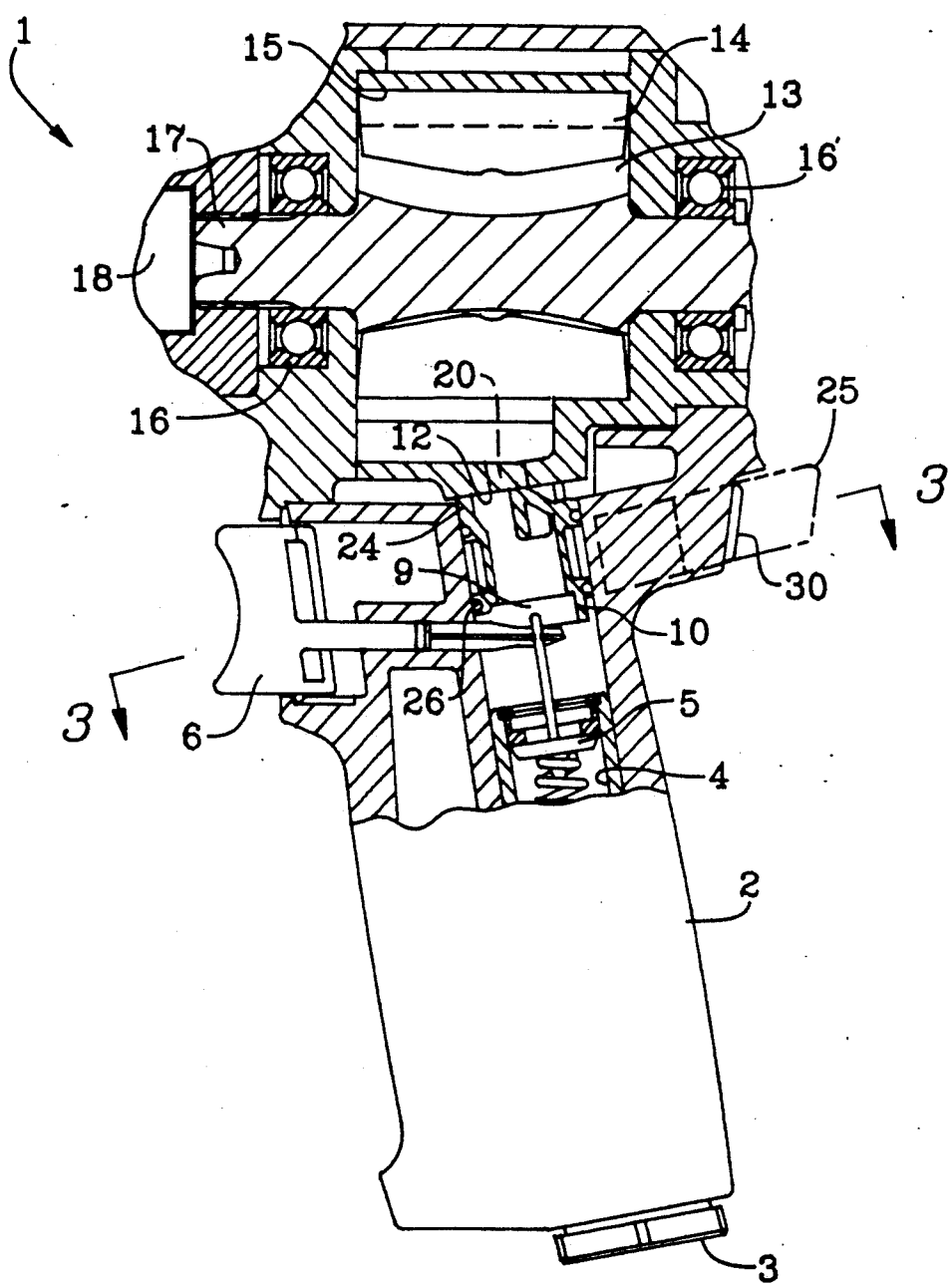
FIG. 1 is a partially sectioned elevation view of a push button reverse valve according to the present invention installed in a pneumatic operated power tool.
Figure 2:
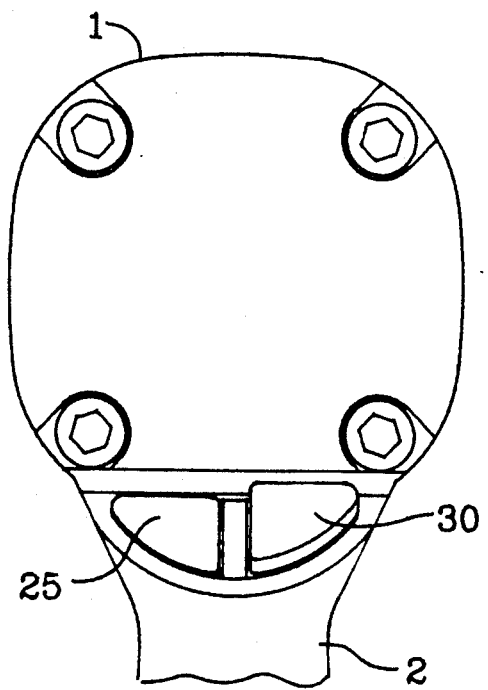
FIG. 2 is an end elevation view showing the push buttons' convenient location.

Referring to FIG. 1, a partial power tool is shown in partial section. The power tool 1 is provided with a handle having a pneumatic fluid or air inlet 3 for providing motive fluid to a pneumatic operated motor or air motor 13. Air is supplied to the air motor through air inlet passageway 4. A tilt valve 5 is operated by means of a trigger 6 to admit pressure fluid to a chamber 9.

Disposed within chamber 9 is a rotary spool performing as a reversing valve means for selectively distributing pressure fluid to a forward supply port 20 or optionally a reverse port 21 (shown hidden behind the forward port 20) at a position of approximately 180 degrees opposite the forward port in the planer plate 12 from the circular end of chamber 9.

The reversing valve spool 10 is provided with a planer segmented end which slidingly cooperates with the planer surface of the plate 12. The spool 10 contains forward and reverse passages 22 and 23, and a notched area 29 which handles secondary exhaust, as will be described later in greater detail.

Air entering the forward or reverse ports 20 or 21 selectively proceeds to drive the air motor 13 in forward or reverse direction as the air is expanded against motor vanes 14 in the motor cylinder 15. The motor rotates on bearings 16 and 16' to drive an output shaft 17 which in turn drives a rotating shaft 18 of the working output device.

Returning now to the cooperating face between the reversing valve 10 and the planer plate 12, air passing the spool 10 from air passage 4 in chamber 9 is directed to two face termination passageways 22, 23. Partition 24 which forms the face seal of the rotary reversing valve is in the form of a semicircular circle having the two pie shaped passageways 22 and 23 extending to the cooperating valve surface. The ports 22, 23 selectively register with either forward port 20 or the reverse port 21 in the valve plate 12. The notched area 29 registers with corresponding port 20 or 21 to bleed secondary exhaust which prevents recompression. The notched area 29 allows the secondary exhaust to enter main exhaust cavity 7.

Since passageways 22 and 23 are located approximately 90 degrees apart and the forward and reversing ports 20, 21 are located approximately 180 degrees apart, it can be appreciated by one skilled in the art that rotating the reversing valve spool approximately 90 degrees will bring one or the other passageways 22, 23 in contact with one of the ports 20 or 21 leading to either the forward or reverse chambers of the motor.

It may now be appreciated by one skilled in the art that rotating the reversing valve spool 1 will accomplish direction of motive fluid to either forward or reverse the motor.

Figure 3:
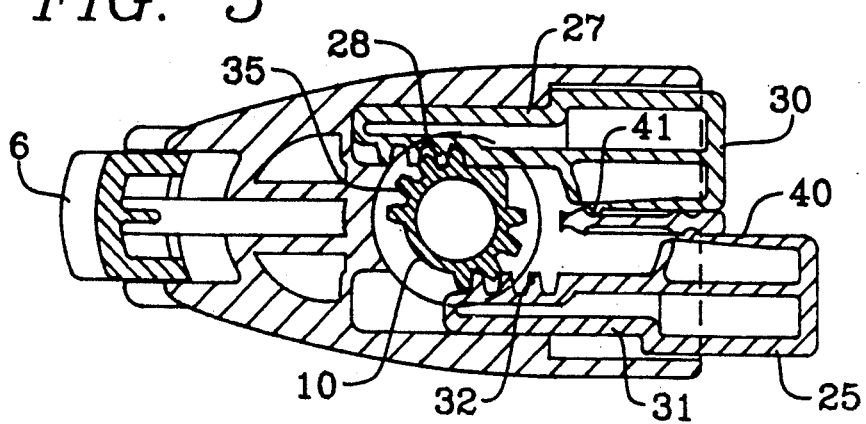
FIG. 3 is a cross sectional view taken at Section 3—3 of FIG. 1 showing the push button actuators for the present invention.

Referring now to FIG. 3, which is a cross section taken at Section 3—3 of FIG. 1, the rotary spool 10 is formed with a plurality of pinion gear teeth about its approximate midsection. A forward push button 30 is shown provided with a rack portion 27 having rack teeth 28 which cooperate with pinion teeth 35 on the rotary reversing spool valve 10. Rotating the rotary spool valve in the counterclockwise direction by depressing push button 30 aligns opening 23 with forward port 20. Conversely, depressing reverse push button 25 to move rack 31 to the left with reverse rack teeth 32 will rotate the reverse valve spool in the clockwise direction to align opening 22 with reverse port 21.

Figure 4:
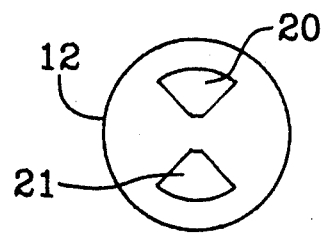
FIG. 4 is a distributor face plate according to the present invention.
Figure 5:
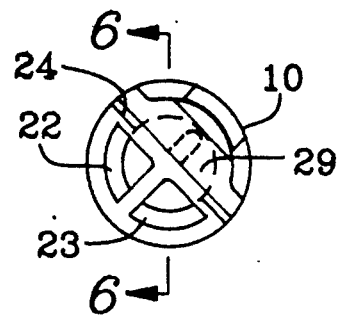
FIG. 5 is an end view of the spool distributor according to the present invention.

It should be understood that FIG. 4 is a bottom view of the reversing valve plate and FIG. 5 is a top view of the reversing valve 10.

Figure 6:
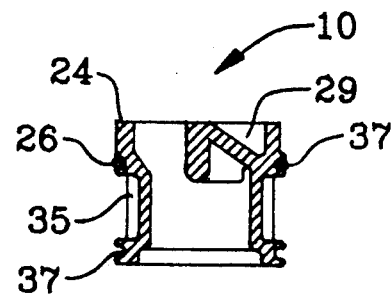
FIG. 6 is a sectioned side elevation of the spool taken at Section 6—6 of FIG. 5.

Referring to FIG. 6, the reversing valve spool 10 is provided with an "O" ring 26 in each of two "O" ring grooves 37 for the purposes of sealing the rack portion against intrusion of pressure fluid thereby preventing leakage to the operating push buttons.

The length of the rack and pinion cooperating teeth and their spacing cooperate to limit the depression excursion of the push buttons and a flexible tab detent 40 and 41 on the reverse push button 25 and the forward push button 30 respectively provide a snap action retention feel to the depression of the push buttons. The detents also retain the selected rotary position of the reversing valve spool 10.

A particular feature of the present invention is the straight line flow of pressure fluid to the forward and reversing motive chamber thus minimizing pressure loss in a reversing valve circuit.

Having described the invention, what is claimed is:

1. A push button reverse valve for a pneumatic pressure operated power tool comprising:
   a rotatable spool disposed in a circular passageway;
   a means for engaging and rotating said spool;
   said spool being further provided with a means for receiving air at its one end and selectively distributing it to one of a plurality of passageways disposed adjacent to its other end;
   said selected distribution being in response to selected rotation of said spool; and
   said means for engaging and rotating said spool further comprises a plurality of side by side positioned push buttons.

2. A push button reverse valve according to claim 1, wherein said means for engaging and rotating said spool further comprises a pair of side by side positioned push buttons each having an extended rack gear means for engaging a pinion gear means on opposite sides of the periphery of said spool for effecting rotation of said spool in response to button movement.

3. A push button reverse valve according to claim 1, wherein said rotatable spool is further provided with a face valving means at its other end which cooperates with a face plate means communicating with said passageways.

4. A push button reverse valve according to claim 3, wherein said face valving means and said face plate means are further provided with cooperating port means.

5. A push button reverse valve according to claim 4, wherein the cooperating port means on said face valving means and said face plate means are spaced apart on the periphery of a circle of the same diameter on each of said face valving means and said face plate means.

6. A push button reverse valve according to claim 5, wherein the cooperating port means on said face valving means and said face plate means are spaced apart a different arcuate angle.

7. A push button reverse valve according to claim 6, wherein the cooperating port means on said face valving means are spaced apart approximately 90 degrees and the cooperating port means on said face plate means are spaced apart approximately 180 degrees whereby rotation of said spool approximately 90 degrees will selectively align one or another of said plurality of passageways to effect selected rotation of the tool.

* * * * *